US011875549B2

(12) United States Patent
Wu et al.

(10) Patent No.: US 11,875,549 B2
(45) Date of Patent: Jan. 16, 2024

(54) DATA PROCESSING METHOD, DEVICE, AND TERMINAL FOR BIOCHIP, AND READABLE MEDIUM (71) Applicant: BOE Technology Group Co., Ltd., Beijing (CN)

(72) Inventors: Qiong Wu, Beijing (CN); Zijian Zhao, Beijing (CN); Yongming Shi, Beijing (CN); Jijing Huang, Beijing (CN); Dawei Tang, Beijing (CN); Zongmin Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 210 days.

(21) Appl. No.: 17/424,172

(22) PCT Filed: Jan. 13, 2021

(86) PCT No.: PCT/CN2021/071365
§ 371 (c)(1),
(2) Date: Jul. 20, 2021

(87) PCT Pub. No.: WO2021/143700
PCT Pub. Date: Jul. 22, 2021

(65) Prior Publication Data
US 2023/0154137 A1 May 18, 2023

(30) Foreign Application Priority Data
Jan. 14, 2020 (CN) .......................... 202010037639.2

(51) Int. Cl.
G06V 10/28 (2022.01)
G06T 5/30 (2006.01)

(52) U.S. Cl.
CPC ................. G06V 10/28 (2022.01); G06T 5/30 (2013.01); G06T 2207/20036 (2013.01); G06V 2201/07 (2022.01)

(58) Field of Classification Search
CPC ...... G06V 10/28; G06V 2201/07; G06T 5/30; G06T 2207/20036
See application file for complete search history.

(56) References Cited

U.S. PATENT DOCUMENTS

2004/0160607 A1 8/2004 Lin et al.
2004/0240718 A1 12/2004 Mori
(Continued)

FOREIGN PATENT DOCUMENTS

CN 1609615 A 4/2005
CN 102073876 A 5/2011
(Continued)

OTHER PUBLICATIONS

Digital Image Processing-Ch9, Gonzalez et al., 2018 (Year: 2018).*
(Continued)

Primary Examiner — Jianxun Yang
(74) Attorney, Agent, or Firm — Ling Wu; Stephen Yang; Ling and Yang Intellectual Property (57) ABSTRACT A data processing method for a biochip comprises: acquiring a biochip image to be detected; performing binarization processing on the biochip image to obtain a binary image; performing a morphological dilation operation on the binary image in a row direction to obtain a first image, and performing a morphological dilation operation on the binary image in a column direction to obtain a second image; performing connected domain detection on the first image in the row direction, and performing connected domain detection on the second image in the column direction, to determine the number of rows and the number of columns of a (Continued)

sample point array and center position information of each sample point.

9 Claims, 6 Drawing Sheets

(56) References Cited

U.S. PATENT DOCUMENTS

2015/0370520 A1* 12/2015 Durlach .................. G09G 5/00
348/488
2018/0101951 A1 4/2018 Xu et al.

FOREIGN PATENT DOCUMENTS

| CN | 103236065 A | 8/2013 |
| CN | 107330899 A | 11/2017 |
| CN | 110033471 A | 7/2019 |
| WO | WO-2005055145 A1 * | 6/2005 ............. G06F 19/20 |

OTHER PUBLICATIONS

International Search Report for PCT/CN2021/071365 dated Apr. 16, 2021.

Duan, Huilong et al.,"A Survey on Image-based Microarray Analysis", Chinese Journal of Biomedical Engineering, vol. 25, No. 6, Dec. 31, 2006, ISSN: 0258-8021, pp. 780-785.

Daniel Bozinov, "Autonomous system for Web-Based Microarray Image Analysis", IEEE Transactions on Nanobioscience, pp. 215-220, vol. 2, No. 4, Dec. 2003.

Brian Stevenson, "MicroArray Image Analysis", "http://www.biodiscovery.com/imagene.asp".

Wang, Lijuan,"Research and Application of Biochip Image Gridding Algorithm", Electronic Technology & Information Science, China Master's Theses Full-Text Database (Electronic Journals), No. 12, Jan. 15, 2019, ISSN: 1674-0246.

* cited by examiner

DATA PROCESSING METHOD, DEVICE, AND TERMINAL FOR BIOCHIP, AND READABLE MEDIUM

CROSS-REFERENCE TO RELATED APPLICATIONS

The present application is a U.S. National Phase Entry of International Application No. PCT/CN2021/071365 having an international filing date of Jan. 13, 2021, which claims priority to Chinese patent application No. 202010037639.2 filed to CNIPA on Jan. 14, 2020, titled "DATA PROCESSING METHOD, DEVICE, AND TERMINAL FOR BIOCHIP, AND READABLE MEDIUM". The entire contents of the above-identified applications are hereby incorporated by reference.

TECHNICAL FIELD

The present disclosure relates to but is not limited to the technical field of image processing, in particular to a data processing method, device, and terminal for a biochip, and a readable medium.

BACKGROUND

The biochip technology fixes a specific amount of biochemical reaction spaces on a substrate with a specific area. During use, a test sample is loaded onto a biochip, reaction conditions are provided to allow a reaction to occur, and then optical and electrical signals that can be detected by the existing technology are used as a basis for determining the intensity or occurrence of the reaction, so as to indirectly obtain the biological information of the test sample. The biochip overcomes the disadvantages of the conventional repeated experiments, thereby reducing the manpower and sample amount and improving the detection accuracy, and is an important means for modern life science research.

Existing biochip sample point detection methods mainly include a parameter-dependent method, a marker-assisted method, a neural network-based automatic detection method, and an edge detection and mesh generation-based automatic detection method. The parameter-dependent method depends on biochip parameters configured or input manually, such as row and column coordinates, and chamber position templates. During use, biochip parameters are necessarily known and input accurately to obtain detection results, leading to the increase of labor cost in the case of a variety of biochips or missing of parameters. The marker-assisted method requires the design of an assisting maker on a biochip, and is applicable to analysis of biochips from a single manufacturer. However, the current biochips come from different manufacturers, and the design modes of the assisting markers of the biochips from different manufacturers are not unified, leading to poor compatibility and flexibility of the marker-assisted method. The algorithm implementations of the existing neural network-based automatic detection method and edge detection and mesh generation-based automatic detection method are relatively complex, and the computation complexity is relatively high.

SUMMARY

The following is a brief description of the subject matter described in detail in the present disclosure. This brief description is not intended to limit the scope of protection of the claims.

The embodiments of the present disclosure provide a data processing method, device, and terminal for a biochip, and a readable medium, which are compatible with a variety of biochip designs and can reduce computation complexity.

In one aspect, the embodiments of the present disclosure provide a data processing method for a biochip, comprising: acquiring a biochip image to be detected; performing binarization processing on the biochip image to obtain a binary image; performing a morphological dilation operation on the binary image in a row direction to obtain a first image, and performing a morphological dilation operation on the binary image in a column direction to obtain a second image; performing connected domain detection on the first image in the row direction, and performing connected domain detection on the second image in the column direction, to determine the number of rows and the number of columns of a sample point array and center position information of each sample point.

In another aspect, the embodiments of the present disclosure provide a data processing device for a biochip, comprising: an image acquisition module configured to acquire a biochip image to be detected; a binarization processing module configured to perform binarization processing on the biochip image to obtain a binary image; a morphological operation module configured to perform a morphological dilation operation on the binary image in a row direction to obtain a first image and perform a morphological dilation operation on the binary image in a column direction to obtain a second image; a first detection module configured to perform connected domain detection on the first image in the row direction and perform connected domain detection on the second image in the column direction, to determine the number of rows and the number of columns of a sample point array and center position information of each sample point.

In another aspect, the embodiments of the present disclosure provide a data processing terminal, comprising: a memory and a processor, the memory storing a computer program, wherein when the computer program is executed by the processor, the steps of the data processing method for a biochip are implemented.

In another aspect, the embodiments of the present disclosure provide a computer-readable medium storing a computer program, wherein when the computer program is executed by a processor, the steps of the data processing method for a biochip are implemented.

According to the embodiments of the present disclosure, the number of rows and the number of columns of the sample point array of the biochip and the center position information of each sample point can be adaptively obtained by performing the binarization processing on the biochip image and performing the morphological dilation operation and the connected domain detection on the obtained binary image, so as to support the implementation of the sample point detection of the biochip. The embodiments of the present disclosure are compatible with a variety of biochip designs, the implementation process is simple, and the computation complexity is relatively low.

After reading and understanding the drawings and the detailed description, a person may understand other aspects.

BRIEF DESCRIPTION OF DRAWINGS

The drawings are used to provide an understanding of the technical solution of the present disclosure and constitute a part of the description. The drawings are used together with the embodiments of the present disclosure to explain the technical solution of the present disclosure and do not constitute limitations to the technical solution of the present disclosure. The shape and size of at least one component in the drawings do not reflect the actual scale, and are only intended to schematically describe the content of the present disclosure.

DETAILED DESCRIPTION

The present disclosure describes a plurality of embodiments, but the description is exemplary rather than restrictive, and it is obvious to those skilled in the art that there may be more embodiments and implementations within the scope of the embodiments described in the present disclosure. Although many possible combinations of features are illustrated in the drawings and discussed in the embodiments, many other combinations of the disclosed features are also possible. Unless specifically limited, any feature or element in any embodiment may be used in combination with or in substitution for any other feature or element in any other embodiments.

The present disclosure includes and envisages combinations with features and elements known to those skilled in the art. The disclosed embodiments, features, and elements in the present disclosure may also be combined with any conventional features or elements to form a unique invention solution defined by the claims. Any feature or element of any embodiment may also be combined with features or elements from other invention solution to form another unique invention solution defined by the claims. Therefore, it should be understood that any feature shown or discussed in the present disclosure may be implemented individually or in any appropriate combination. Therefore, the embodiments are subject no limitations other than those made in accordance with the appended claims and their equivalent replacements. In addition, at least one modification and change can be made within the scope of protection of the appended claims.

In addition, when describing representative embodiments, the description may have presented a method or process as a specific sequence of steps. However, to the extent that the method or process does not depend on the specific order of steps described herein, the method or process should not be limited to the specific order of steps described herein. As will be understood by those skilled in the art, other sequences of steps are also possible. Therefore, the specific sequence of steps set forth in the description should not be interpreted as a limitation to the claims. In addition, the claims for the method or process should not be limited to the steps of executing the method or process in the written order. Those skilled in the art could easily understand that these orders can be changed and still fall within the spirit and scope of the embodiments of the present disclosure.

The embodiments of the present disclosure provide a data processing method, device, and terminal for a biochip, and a readable medium, which are compatible with a variety of biochip designs and can reduce computation complexity. In the data processing method provided by the embodiments of the present disclosure, biological information of a test sample is obtained by analyzing a biochip image obtained after the test sample is loaded onto a biochip. The data processing method provided by the embodiments is applicable to array-type fluorescent biochips.

Figure 1:
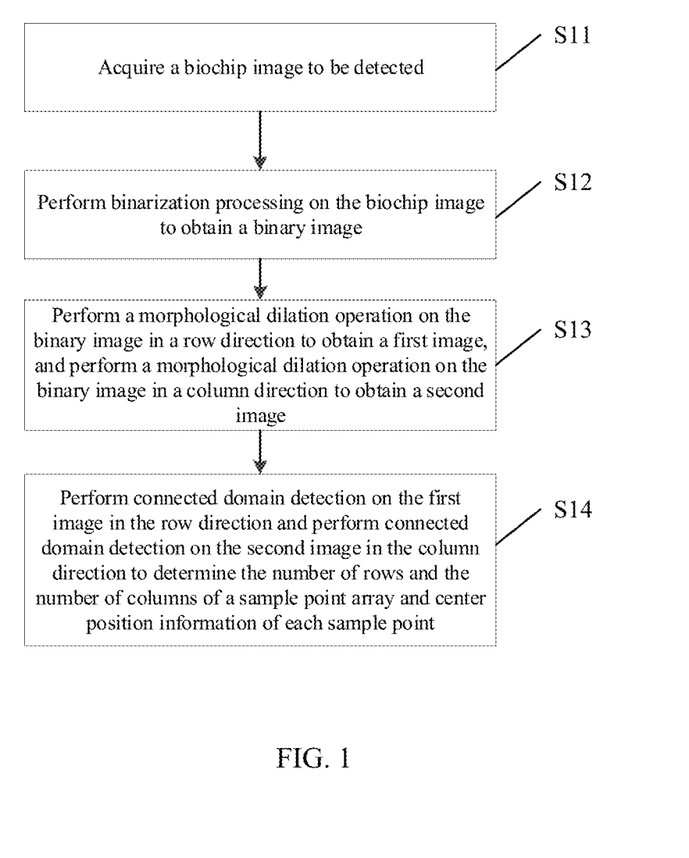
FIG. 1 is a flowchart of a data processing method for a biochip provided by at least one embodiment of the present disclosure.

FIG. 1 is a flowchart of a data processing method for a biochip provided by at least one embodiment of the present disclosure. Referring to FIG. 1, the data processing method for a biochip provided by this embodiment includes the following steps:

Step S11: A biochip image to be detected is obtained.

Step S12: Binarization processing is performed on the biochip image to obtain a binary image.

Step S13: A morphological dilation operation is performed on the binary image in a row direction to obtain a first image, and a morphological dilation operation is performed on the binary image in a column direction to obtain a second image.

Step S14: Connected domain detection is performed on the first image in the row direction, and connected domain detection is performed on the second image in the column direction, to determine the number of rows and the number of columns of a sample point array and center position information of each sample point.

In this embodiment, the row direction may be the horizontal direction of the sample point array, and the column direction may be the vertical direction of the sample point array. This embodiment performs adaptive detection on a collimated sample point array. The collimated sample point array may refer to a sample point array in which the row direction of the sample point array is parallel to or has an angle within an error range with respect to the horizontal direction and the column direction of the sample point array is parallel to or has an angle within an error range with respect to the vertical direction. When the sample point array in the biochip image has an inclination angle, the biochip image may be collimated first, and then the adaptive detection may be performed according to the data processing method provided by this embodiment.

In some exemplary embodiments, the sample point in the biochip image may be circular or rectangular. However, the present disclosure is not limited thereto.

In some exemplary embodiments, the performing a morphological dilation operation on the binary image in a row direction to obtain a first image in step S13 may include: performing the morphological dilation operation on the binary image in the row direction according to a first dilation operator to obtain the first image, wherein a connected domain in the row direction in the first image represents a row of sample points.

In step S13, the performing a morphological dilation operation on the binary image in a column direction to obtain a second image may include: performing the morphological dilation operation on the binary image in the column direction according to a second dilation operator to obtain the second image, wherein a connected domain in the column direction in the second image represents a column of sample points.

In some exemplary embodiments, the value of the first dilation operator in the row direction is the width of the biochip image, and the value of the second dilation operator in the column direction is the height of the biochip image. In addition, the value of the first dilation operator in the column direction may be 1, and the value of the second dilation operator in the row direction may be 1. However, the present disclosure is not limited thereto. The width of the biochip image is the length of the biochip image along the horizontal direction, and the height of the biochip image is the length of the biochip image along the vertical direction.

In some exemplary embodiments, step S14 may include: detecting a connected domains in the row direction in the first image to determine the number of rows of the sample point array and center position information of each row of sample points in the column direction; detecting a connected domains in the column direction in the second image to determine the number of columns of the sample point array and center position information of each column of sample points in the row direction; obtaining the center position information of each sample point according to the center position information of each row of sample points in the column direction and the center position information of each column of sample points in the row direction. The center position information may include coordinate values in an image pixel coordinate system determined according to the biochip image. The center position information of each row of sample points in the column direction may be stored in a one-dimensional vector, and the length of the one-dimensional vector is the number of rows of the sample point array. The center position information of each column of sample points in the row direction may be stored in a one-dimensional vector, and the length of the one-dimensional vector is the number of columns of the sample point array. However, the present disclosure is not limited thereto. In other implementations, the number of rows of the sample point array and the center position information of each row of sample points in the column direction may be stored in a two-dimensional vector. For example, a row serial number and corresponding center position information may be recorded in the two-dimensional vector.

In some exemplary embodiments, the detecting a connected domain in the row direction in the first image to determine the number of rows of the sample point array and center position information of each row of sample points in the column direction may include: obtaining the number of rows of the sample point array and the center position information of each row of sample points in the column direction based on the first image by using a findContours function in an Open Source Computer Vision Library (OpenCV).

The detecting a connected domain in the column direction in the second image to determine the number of columns of the sample point array and center position information of each column of sample points in the row direction may include: obtaining the number of columns of the sample point array and the center position information of each column of sample points in the row direction based on the second image by using the findContours function in the OpenCV.

In this exemplary embodiment, the algorithm implementation can be simplified using the findContours function in the OpenCV. However, the present disclosure is not limited thereto. In other implementations, other existing edge detection algorithms or self-defined edge detection algorithms may be adopted to detect the connected domain.

In some exemplary embodiments, the data processing method provided by this embodiment may further include: performing binarization processing on the biochip image to obtain a target image, or performing binarization processing and a morphological operation on the biochip image to obtain a target image, wherein a threshold used in the binarization processing performed to obtain the target image is greater than a threshold used in the binarization processing performed to obtain the binary image; and performing sample point detection on the target image based on the number of rows and the number of columns of the sample point array and the center position information of each sample point to determine the position of a positive sample point in the sample point array.

In this exemplary embodiment, the morphological operation may include a dilation operation, or a dilation operation plus a corrosion operation. The morphological operation can eliminate the influence of noise, thereby improving the robustness on image noise and improving the computation reliability.

In some exemplary embodiments, the performing sample point detection on the target image based on the number of rows and the number of columns of the sample point array and the center position information of each sample point to determine the position of a positive sample point in the sample point array may include:

obtaining an initialized sample point detection matrix based on the number of rows and the number of columns of the sample point array (for example, the sample point detection matrix is initialized to a zero matrix);

traversing a pixel value corresponding to a center position of each sample point in the target image and a pixel value corresponding to a neighborhood of the center position of the sample point based on the center position information of each sample point in the sample point array; in response to detecting that a pixel value corresponding to a center position of any sample point in the target image or a pixel value corresponding to a neighborhood of the center position of the sample point is a first numerical value (for example, 255), updating an element value at a position corresponding to the sample point in the sample point detection matrix to a third numerical value (for example, 1); in response to detecting that a pixel value corresponding to a center position of any sample point in the target image or a pixel value corresponding to a neighborhood of the center position of the sample point is a second numerical value (for example, 0), maintaining the element value at the position corresponding to the sample point in the sample point detection matrix to an initial value; and     determining the position of the positive sample point in the sample point array according to the position of the third numerical value in the sample point detection matrix obtained by traversing the target image.

In this exemplary embodiment, the pixel values corresponding to the center position of each sample point and four neighborhoods of the center position may be traversed, or the pixel values corresponding to the center position of each sample point and eight neighborhoods of the center position may be traversed. However, the present disclosure is not limited thereto.

In this exemplary embodiment, positive and negative property detection of the sample point is performed by traversing the pixel values corresponding to the center position of each sample point and the neighborhoods of the center position in the target image, so as to position the positive sample point in the sample point array.

In some exemplary embodiments, the data processing method provided by this embodiment may further include: performing sample point detection on the target image based on the number of rows and the number of columns of the sample point array and the center position information of each sample point to determine the number of positive sample points; or obtaining the number of positive sample points in the sample point array based on the target image by using the findContours function in the OpenCV.

Exemplarily, after the positive sample point is positioned based on the sample point detection matrix, the total number of the third numerical values in the sample point detection matrix can be calculated, which is the number of the positive sample points. Alternatively, the number of the positive sample points may be initialized to 0. In the process of traversing the target image based on the center position information of each sample point, in response to detecting that the pixel value corresponding to the center position of the sample point or the pixel value corresponding to the neighborhood of the center position in the target image is the first numerical value, the number of the positive sample points is updated, i.e., accumulatively added with 1. After the traversing is completed, the number of the positive sample points in the sample point array can be obtained.

The data processing method provided by this embodiment is described below in detail via an exemplary implementation process.

Figure 2:
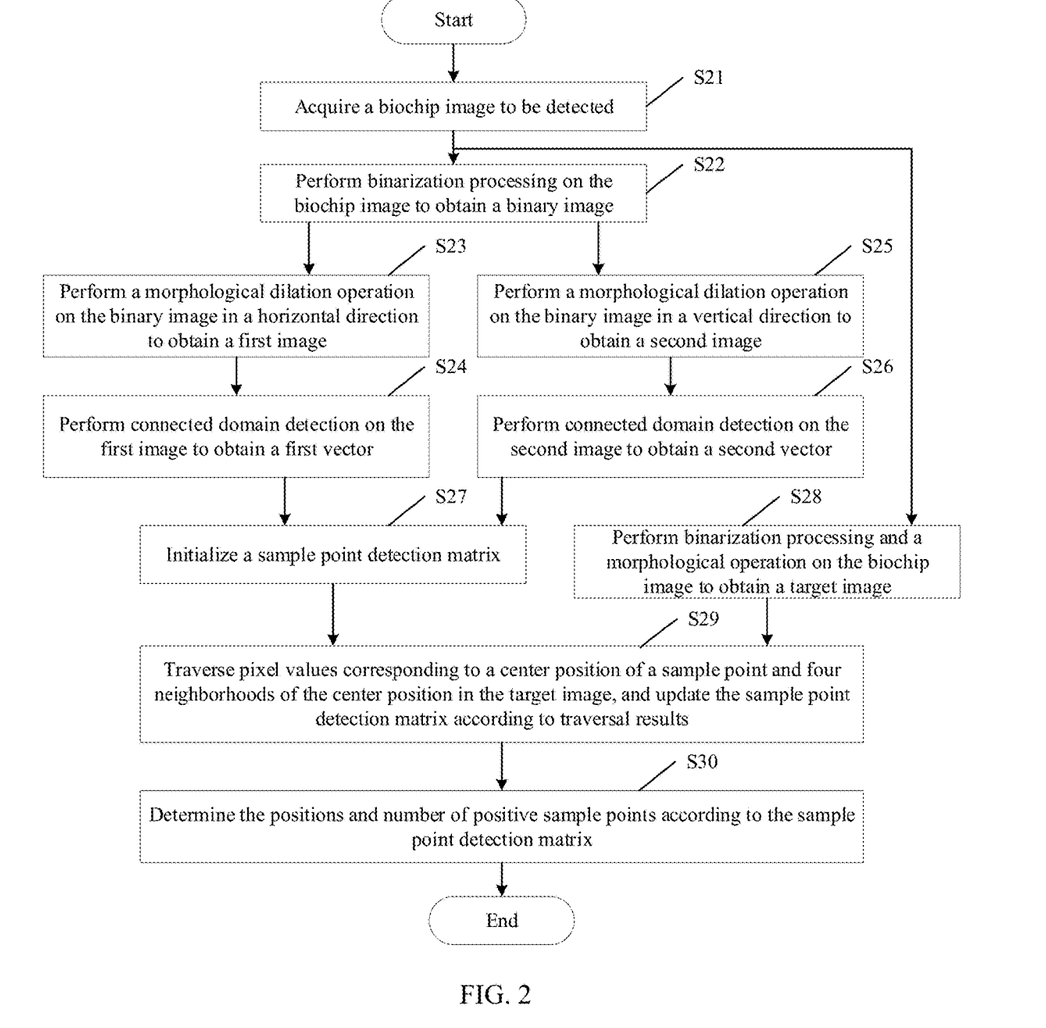
FIG. 2 is an exemplary flowchart of a data processing method for a biochip provided by at least one embodiment of the present disclosure.

FIG. 2 is an exemplary flowchart of a data processing method for a biochip provided by at least one embodiment of the present disclosure. This exemplary embodiment is used to count and position positive sample points in a sample point array of an array-type fluorescent biochip.

The time complexity of the data processing method provided by this exemplary embodiment may be linear O(n), and the space complexity may be O(n). However, the present disclosure is not limited thereto.

Referring to FIG. 2, the data processing method provided by this exemplary embodiment includes the following steps.

Step S21: A biochip image to be detected is acquired, wherein the biochip image to be detected may be represented as im_ori.

Figure 3:
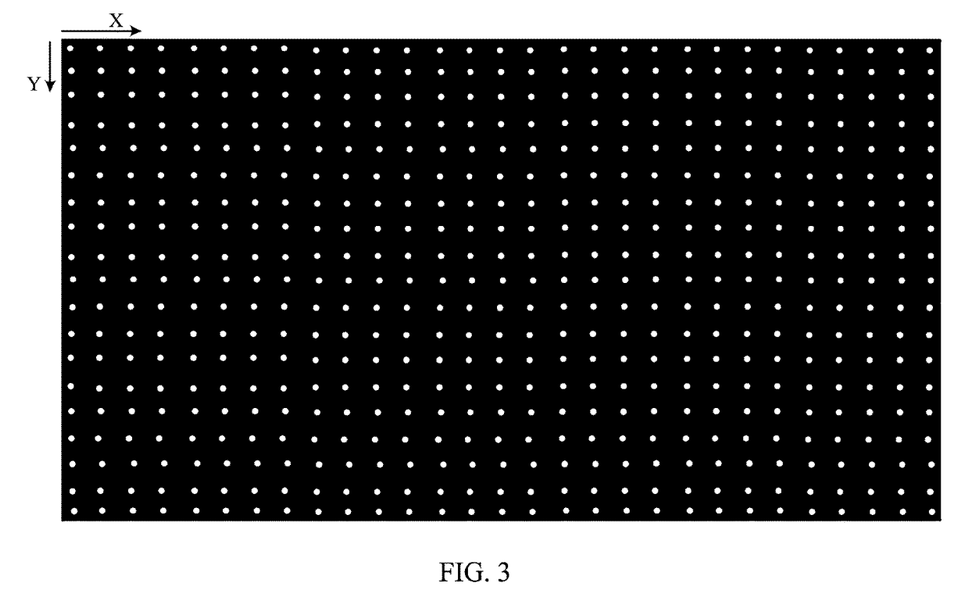
FIG. 3 is an exemplary diagram of a biochip image to be detected according to at least one embodiment of the present disclosure.

In this exemplary embodiment, after a test sample is loaded onto the biochip, reaction conditions are provided to allow a reaction to occur, and the biochip image to be detected may be obtained via a photographing technology, as illustrated in FIG. 3.

In some examples, if a sample point array in the biochip image to be detected is inclined, the biochip image needs to be adjusted to make the sample point array collimated before subsequent processing. A processing mode of image collimation is not limited in the present disclosure.

In this exemplary embodiment, an image pixel coordinate system is defined using the upper left corner of the biochip image as an origin, wherein the row direction may be the horizontal direction and parallel to the X-coordinate axis (such as the X-axis illustrated in FIG. 3), and the column direction may be the vertical direction and parallel to the Y-coordinate axis (such as the Y-axis illustrated in FIG. 3). However, the present disclosure is not limited thereto. In other embodiments, the origin of the image pixel coordinate system may be the lower left corner or the upper right corner of the biochip image.

Step S22: Binarization processing is performed on the biochip image im_ori by using the Otsu algorithm to obtain a binary image, which is represented as im_bin, for example. A threshold T1 for the binarization processing can be obtained by using the Otsu algorithm. However, the present disclosure is not limited thereto. In other embodiments, other binarization algorithms may be used, or a default threshold may be adopted for the binarization processing.

In this exemplary embodiment, for the biochip image illustrated in FIG. 3, a white region (with a gray value 255) of the binary image obtained by via the binarization processing in step S22 represents a chip sample point, and a black region (with a gray value 0) represents a chip background. However, the present disclosure is not limited thereto. In other implementations, the white region of the binary image may represent the chip background, and the black region may represent the chip sample point.

Step S23: A morphological dilation operation is performed on the binary image im_bin in the horizontal direction (i.e., row direction) to obtain a first image, which is represented as im_bin_h, for example. In this step, the morphological dilation operation is performed by adopting a first dilation operator, wherein the value of the first dilation operator in the horizontal direction may be the width of the biochip image, and the value of the first dilation operator in the vertical direction may be 1, for example, the first dilation operator may be the width of the biochip image*1. However, the present disclosure is not limited thereto. The first dilation operator may have other values, as long as it is ensured that each row of sample points form a connected domain through the dilation operation.

A plurality of connected regions may be formed in the binary image via step S23, wherein each row of sample points may form a connected domain.

Step S24: Connected domain detection is performed on the first image im_bin_h to determine the number of rows of the sample point array and the center position information (such as center coordinate values) of each row of sample points in the column direction, so as to obtain a first vector coo_h.

In this step, the number of rows of a chamber array (i.e., the sample point array) and a center coordinate value (i.e., a Y-coordinate value of the center of each row) of each row in the vertical direction may be obtained by using the findContours function in the OpenCV, and the center coordinate values are stored into the first vector coo_h from top to bottom. The first vector coo_h may be a one-dimensional vector, the Y-coordinate value of the center of each row of sample points is stored in the first vector coo_h, and the length of the vector represents the number of rows of the sample point array. However, the present disclosure is not limited thereto. In other implementations, a two-dimensional vector may be used to store row serial numbers and the center coordinate value of each row in the vertical direction.

An input of the findContours function may be the first image im_bin_h, an output may be a set of contour points of each connected domain, a Y-coordinate value corresponding to the center of each connected domain can be computed according to output information of the findContours function, and the Y-coordinate values are sequentially stored in the first vector coo_h.

The number of rows of the sample point array and the center position information of each row can be adaptively obtained via step S24.

Step S25: A morphological dilation operation is performed on the binary image im_bin in the vertical direction (i.e., column direction) to obtain a second image, which is represented as im_bin_v, for example. In this step, the morphological dilation operation is performed by adopting a second dilation operator, wherein the value of the second dilation operator in the vertical direction may be the height of the biochip image, and the value of the second dilation operator in the horizontal direction may be 1, for example, the second dilation operator may be 1*the height of the biochip image. However, the present disclosure is not limited thereto. The second dilation operator may have other values, as long as it is ensured that each column of sample points form a connected domain through the dilation operation.

A plurality of connected regions may be formed in the binary image via step S25, wherein each column of sample points may form a connected domain.

Step S26: Connected domain detection is performed on the second image im_bin_v to determine the number of columns of the sample point array and the center position information (such as center coordinate values) of each column of sample points, so as to obtain a second vector coo_v.

In this step, the number of columns of the chamber array and a center coordinate value (i.e., an X-coordinate value of the center of each column) of each column in the horizontal direction may be obtained by using the findContours function in the OpenCV, and the center coordinate values are stored in the second vector coo_v from left to right. The second vector coo_v may be a one-dimensional vector, the X-coordinate value of the center of each column of sample points is stored in the second vector coo_v, and the length of the vector represents the number of columns of the sample point array. However, the present disclosure is not limited thereto. In other implementations, a two-dimensional vector may be used to store column serial numbers and the center coordinate value of each column in the horizontal direction.

An input of the findContours function may be the second image im_bin_v, an output may be a set of contour points of each connected domain, the Y-coordinate value corresponding to the center of each connected domain can be computed according to output information of the findContours function, and the X-coordinate values are sequentially stored in the second vector coo_v.

The number of columns of the sample point array and the center position information of each column can be adaptively obtained via step S26.

Step S27: A sample point detection matrix sample_loc is initialized to a zero matrix, wherein the number of rows of the sample point detection matrix sample_loc is the vector length of the first vector coo_h obtained in step S24, and the number of columns is the vector length of the second vector coo_v obtained in step S26.

The sample point detection matrix sample_loc obtained via the initialization in this step can be used to store subsequent detection results of positive sample points.

Step S28: Binarization processing and a morphological operation are performed on the biochip image im_ori to obtain a target image, which is represented as im_bin_positive, for example. In this step, the binarization processing is first performed on the biochip image, and then the morphological operation is performed on the obtained binary image, so as to eliminate the influence of noise, thereby improving the robustness on image noise and improving the computation reliability.

A threshold T2 adopted for the binarization processing in this step is greater than the threshold T1 adopted in step S22, for example, T2=T1+50. However, the present disclosure is not limited thereto.

In this step, the morphological operation may include a dilation operation, or a dilation operation plus a corrosion operation. For example, the dilation operator of the morphological operation in this step may be 5*5. However, the present disclosure is not limited thereto.

Step S29: For the target image im_bin_positive obtained in step S28, a pixel value corresponding to a center position of the sample point and pixel values corresponding to four neighborhoods of the center position are traversed, and the sample point detection matrix sample_loc is updated according to traversal results.

For example, a white region (with a gray value 255) in the target image represents a chip sample point, and a black region (with a gray value 0) represents a chip background. In the process of traversing the pixel values of the target image, in response to detecting that the pixel value corresponding to the center position of the sample point is 255 or the pixel value corresponding to at least one of the four neighborhoods of the center position of the sample point is 255, 1 is assigned to an element value of the position corresponding to the sample point in the sample point detection matrix sample_loc. Otherwise, the element value of the position corresponding to the sample point in the sample point detection matrix sample_loc is maintained unchanged, that is, it is still 0.

For example, a white region (with a gray value 255) in the target image represents a chip background and a black region (with a gray value 0) represents a chip sample point. In the process of traversing the pixel values of the target image, in response to detecting that the pixel value corresponding to the center position of the sample point is 0 or the pixel value corresponding to at least one of the four neighborhoods of the center position of the sample point is 0, 1 is assigned to an element value of the position corresponding to the sample point in the sample point detection matrix sample_loc. Otherwise, the element value of the position corresponding to the sample point in the sample point detection matrix sample_loc is maintained unchanged, that is, it is still 0.

In this step, the center position of the sample point may be determined according to the first vector coo_h obtained in step S24 and the second vector coo_v obtained in step S26. For example, the center position of the sample point in the first row and first column may be determined according to a first coordinate value in the first vector coo_h and a first coordinate value in the second vector coo_v. The first coordinate value in the first vector coo_h is the Y-coordinate value of the center of the sample point, and the first coordinate value in the second vector coo_v is the X-coordinate value of the center of the sample point. Similarly, a center position of a sample point in the i-th row and j-th column is a coordinate position determined using an i-th coordinate value in the first vector coo_h as the Y-coordinate value and a j-th coordinate value in the second vector coo_v as the X-coordinate value, wherein i and j both are positive integers, i is less than or equal to the total number of rows, and j is less than or equal to the total number of columns.

The number of the traversed neighborhoods of the center position of the sample point is not limited in the present disclosure. For example, in other implementations, the pixel value corresponding to the center position of the sample point of the target image and pixel values corresponding to eight neighborhoods of the center position may be traversed.

Step S30: The positions and number (i.e., the number of non-zero elements in the sample point detection matrix sample_loc) of positive sample points are determined according to the sample point detection matrix sample_loc updated in step S29. A position with an element value 1 in the sample point detection matrix sample_loc indicates a positive sample point, and a position with an element value 0 indicates a negative sample point.

In some exemplary embodiments, based on the biochip image illustrated in FIG. 3, a sample point detection matrix sample_loc as shown below can be obtained via the processing in this embodiment:

[0,0,0,0,0,0,0,0,0,0,0,0,0,0,0,0,0,0,0,0,0,0,0,0,0,1;
1,1,1,1,0,0,0,0,0,0,0,0,0,0,0,0,0,0,0,0,0,0,0,0,0,0;
0,0,0,0,0,0,0,0,0,0,1,1,1,1,1,1,1,1,0,0,0,0,0,0,0,0,1;
1,0,0,0,0,0,0,0,1,1,1,0,0,0,0,0,1,1,1,1,1,1,0,0,0,0,0,0;
0,0,0,0,0,0,0,0,1,0,0,0,0,0,0,0,1,1,0,0,0,0,0,0,0,0,0,1;
1,0,0,1,1,0,0,0,0,0,0,1,1,1,0,1,1,1,1,1,0,0,0,0,0,0,0,0;
1,0,0,0,0,0,1,1,0,0,0,1,1,0,0,0,1,0,0,0,1,0,0,0,0,0,0,0;
0,1,1,0,1,0,1,0,0,1,0,0,0,1,0,0,1,1,0,0,1,1,0,0,0,0,1,1;
0,1,1,0,0,1,0,0,0,1,0,1,0,0,1,0,0,1,1,1,0,0,1,0,1,1,0,0,0;
0,0,0,1,1,0,1,0,0,0,0,0,0,0,1,0,1,1,1,1,0,0,0,0,0,0,0,1,0;
1,0,0,0,0,0,1,0,0,0,0,0,1,1,0,0,0,0,0,1,0,0,0,0,1,0,1,1;
0,0,0,0,0,0,0,0,1,1,0,0,1,0,0,0,0,0,0,0,0,0,0,0,0,0,0,1,0;
0,0,0,0,0,0,0,1,0,1,0,1,1,1,0,0,0,0,1,1,0,0,1,0,0,0,0,0,1,0;
1,0,0,1,0,0,0,0,0,0,0,0,0,0,0,0,0,0,0,0,0,0,0,0,0,0,0,0,0;
0,1,0,0,0,1,1,1,0,0,0,1,0,0,0,0,1,0,0,1,1,0,0,0,1,1,0,0,0,1,1,0;
0,0,1,1,0,0,1,0,0,0,0,0,0,1,1,1,0,0,0,0,0,0,0,0,0,1,0,0,0,0,0,1;
0,0,0,0,0,0,0,0,1,0,0,0,0,0,0,1,0,1,0,0,0,1,1,0,1,1,0,0,0,0,0,0;
1,0,0,0,0,0,0,0,1,0,0,0,0,0,0,0,1,0,0,0,0,0,0,0,0,0,0,0,0,0,0,0,0,1;
1,1,0,0,0,0,0,0,1,0,0,0,0,0,0,0,1,0,0,0,0,0,0,0,0,1,0,0,0,0,0,0,0,0,0]

In this exemplary embodiment, according to the number of the non-zero elements in the sample point detection matrix sample_loc, it can be seen that the number of the positive sample points in the biochip image illustrated in FIG. 3 is 137.

In this exemplary embodiment, the positive sample point may be positioned according to the position of the non-zero element in the sample point detection matrix. For example, if an element value in the second row and first column in the sample point detection matrix is 1, it can be determined that a sample point in the second row and first column in the sample point array is a positive sample point.

In some exemplary embodiments, if the element values in the initialized sample point detection matrix sample_loc are all 1, in step S29, an element value at a position corresponding to the detected positive sample point may be updated to 0, and an element value at a position corresponding to the negative sample point may be maintained to 1; then, the number of the positive sample points may be obtained by calculating the number of element values of 0 in the sample point detection matrix sample_loc.

Figure 4:
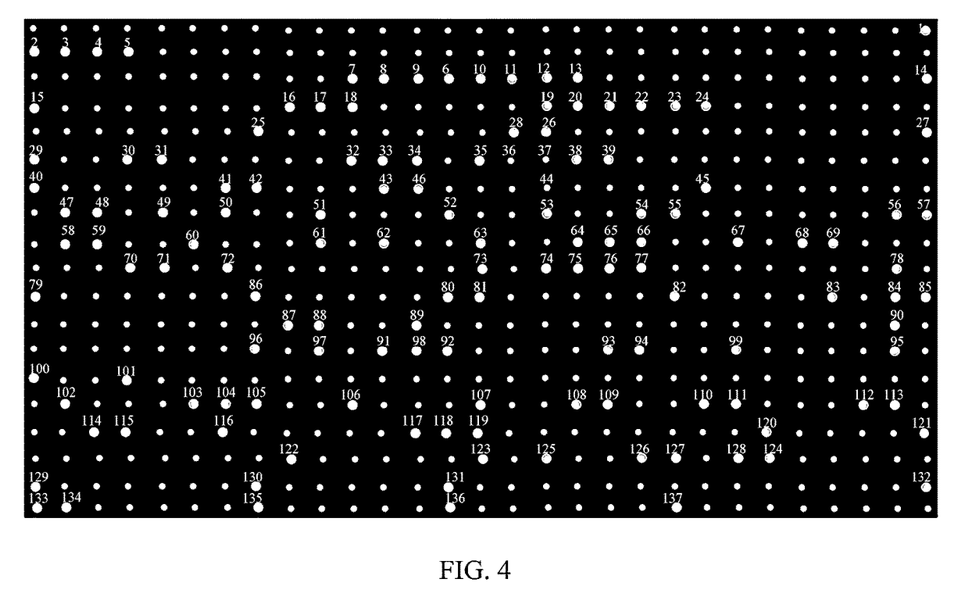
FIG. 4 is an exemplary diagram of output results according to at least one embodiment of the present disclosure.

In some exemplary embodiments, after the sample point detection matrix sample_loc is obtained, a result of the sample point detection matrix sample_loc may be superimposed on the biochip image to be detected to obtain a visualization result as illustrated in FIG. 4, so as to intuitively understand the positions and number of the positive sample points.

In the data processing method provided by this embodiment, automatically detection of the sample point array in the biochip image is implemented based on the image binarization processing, morphological operation, and connected domain detection by using the function in the OpenCV, to obtain the adaptive sample point array information (the number of rows and the number of columns of the sample point array and the center position information of each sample point), and the positions and number of the positive sample points can be detected based on the sample point array information. The data processing method provided by this embodiment can reduce the computation complexity, improve the computation speed, and is compatible with a variety of chip designs. Moreover, the influence of noise around the sample point can be effectively eliminated, having relatively well robustness on image noise, and thereby increasing the algorithm reliability.

Figure 5:
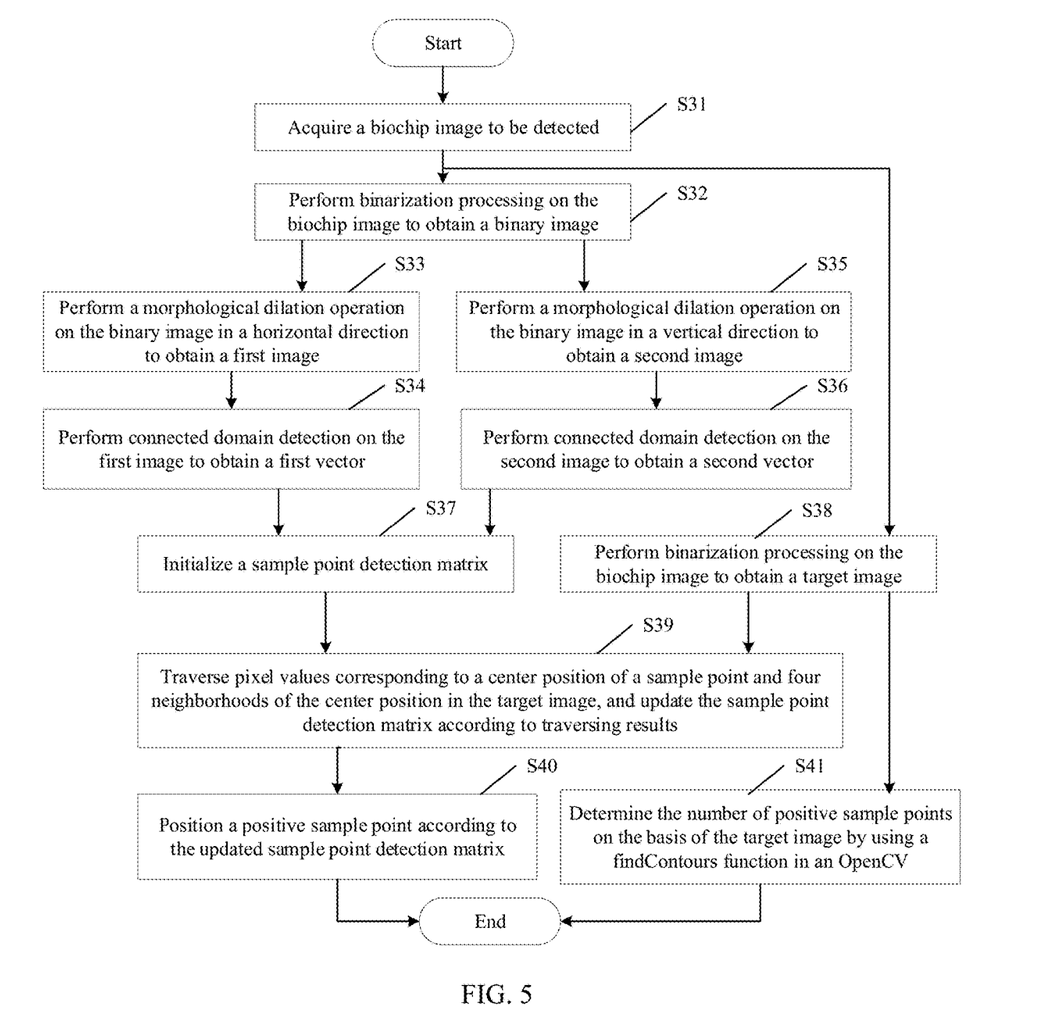
FIG. 5 is another exemplary flowchart of a data processing method for a biochip provided by at least one embodiment of the present disclosure.

FIG. 5 is another exemplary flowchart of a data processing method for a biochip provided by at least one embodiment of the present disclosure. Referring to FIG. 5, the data processing method provided by this embodiment includes step S31 to step S41. The difference between the data processing method provided by this embodiment and the data processing method illustrated in FIG. 2 lies in: a mode of determining the number of positive sample points.

In this exemplary embodiment, in step S41, the number of the positive sample points in the sample point array is obtained based on the target image obtained in step S38 by using the findContours function in the OpenCV. Connected domain detection is performed on the target image by using the findContours function, and the total number of the detected connected domains is the number of the positive sample points.

In step S40, the positive sample point is positioned according to the updated sample point detection matrix sample_loc. For the mode of positioning the positive sample point, reference may be made to the description of the embodiment illustrated in FIG. 2.

For other steps in this exemplary embodiment, reference may be made to the description of the embodiment illustrated in FIG. 2, which is not described in detail herein.

Figure 6:
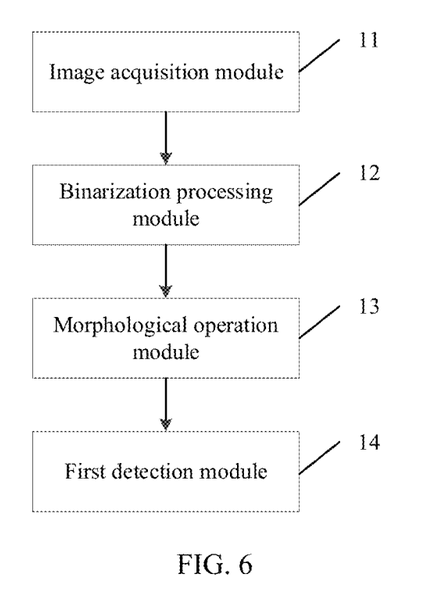
FIG. 6 is a schematic diagram of a data processing device for a biochip provided by at least one embodiment of the present disclosure.

FIG. 6 is a schematic diagram of a data processing device for a biochip provided by at least one embodiment of the present disclosure. Referring to FIG. 6, the data processing device provided by this embodiment includes an image acquisition module 11, a binarization processing module 12, a morphological operation module 13, and a first detection module 14. The image acquisition module 11 is configured to acquire a biochip image to be detected. The binarization processing module 12 is configured to perform binarization processing on the biochip image to obtain a binary image. The morphological operation module 13 is configured to perform a morphological dilation operation on the binary image in a row direction to obtain a first image, and perform a morphological dilation operation on the binary image in a column direction to obtain a second image. The first detection module 14 is configured to perform connected domain detection on the first image in the row direction and perform connected domain detection on the second image in the column direction, to determine the number of rows and the number of columns of a sample point array and center position information of each sample point.

In some exemplary embodiments, the morphological operation module 13 is configured to perform, in the following mode, the morphological dilation operation on the binary image in the row direction to obtain the first image: performing the morphological dilation operation on the binary image in the row direction according to a first dilation operator to obtain the first image, wherein a connected domain in the row direction in the first image represents a row of sample points. The morphological operation module 13 is configured to perform, in the following mode, the morphological dilation operation on the binary image in a column direction to obtain the second image: performing the morphological dilation operation on the binary image in the column direction according to the second dilation operator to obtain the second image, wherein a connected domain in the column direction in the second image represents a column of sample points.

In some exemplary embodiments, the value of the first dilation operator in the row direction is the width of the biochip image, and the value of the second dilation operator in the column direction is the height of the biochip image.

In some exemplary embodiments, the first detection module 14 is configured to perform, in the following mode, the connected domain detection on the first image in the row direction and the connected domain detection on the second image in the column direction to determine the number of rows and the number of columns of the sample point array and the center position information of each sample point: detecting a connected domain in the row direction in the first image to determine the number of rows of the sample point array and center position information of each row of sample points in the column direction; detecting a connected domain in the column direction in the second image to determine the number of columns of the sample point array and center position information of each column of sample points in the row direction; and obtaining the center position information of each sample point according to the center position information of each row of sample points in the column direction and the center position information of each column of sample points in the row direction.

In some exemplary embodiments, the first detection module 14 is configured to detect, in the following mode, the connected domain in the row direction in the first image to determine the number of rows of the sample point array and the center position information of each row of sample points in the column direction: obtaining the number of rows of the sample point array and the center position information of each row of sample points in the column direction based on the first image by using a findContours function in an OpenCV. The first detection module 14 is configured to detect, in the following mode, the connected domain in the column direction in the second image to determine the number of columns of the sample point array and the center position information of each column of sample points in the row direction: obtaining the number of columns of the sample point array and the center position information of each column of sample points in the row direction based on the second image by using the findContours function in the OpenCV.

Figure 7:
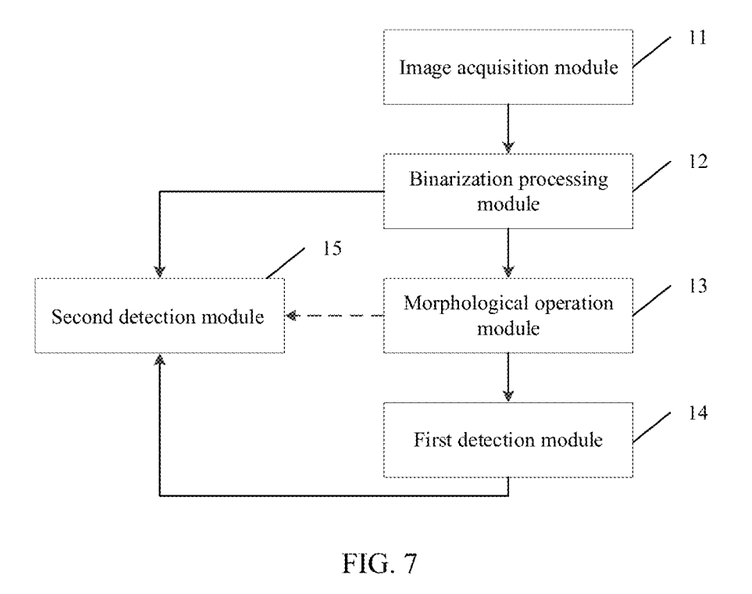
FIG. 7 is an exemplary diagram of the data processing device for a biochip provided by at least one embodiment of the present disclosure.

In some exemplary embodiments, referring to FIG. 7, the binarization processing module 12 is further configured to perform binarization processing on the biochip image to obtain a target image. Alternatively, the binarization processing module 12 and the morphological operation module 13 are further configured to sequentially perform binarization processing and a morphological operation on the biochip image to obtain a target image. A threshold used in the binarization processing performed to obtain the target image is greater than a threshold used in the binarization processing performed to obtain the binary image.

Referring to FIG. 7, the data processing device provided by this exemplary embodiment may further include a second detection module 15 configured to perform sample point detection on the target image based on the number of rows and the number of columns of the sample point array and the center position information of each sample point to determine position information of a positive sample point.

In some exemplary embodiments, the second detection module 15 is configured to perform, in the following mode, the sample point detection on the target image based on the number of rows and the number of columns of the sample point array and the center position information of each sample point to determine the positions of the positive sample point in the sample point array: obtaining an initialized sample point detection matrix based on the number of rows and the number of columns of the sample point array; traversing a pixel value corresponding to a center position of each sample point in the target image and a pixel value corresponding to a neighborhood of the center position of the sample point; in response to detecting that a pixel value corresponding to a center position of any sample point in the target image or a pixel value corresponding to a neighborhood of the center position of the sample point is a first numerical value, updating an element value at a position corresponding to the sample point in the sample point detection matrix to a third numerical value; in response to detecting that a pixel value corresponding to a center position of any sample point in the target image or a pixel value corresponding to a neighborhood of the center position of the sample point is a second numerical value, maintaining an element value at a position corresponding to the sample point in the sample point detection matrix to an initial value; and determining the position of the positive sample point in the sample point array according to the position of the third numerical value in the sample point detection matrix obtained by traversing the target image.

Figure 8:
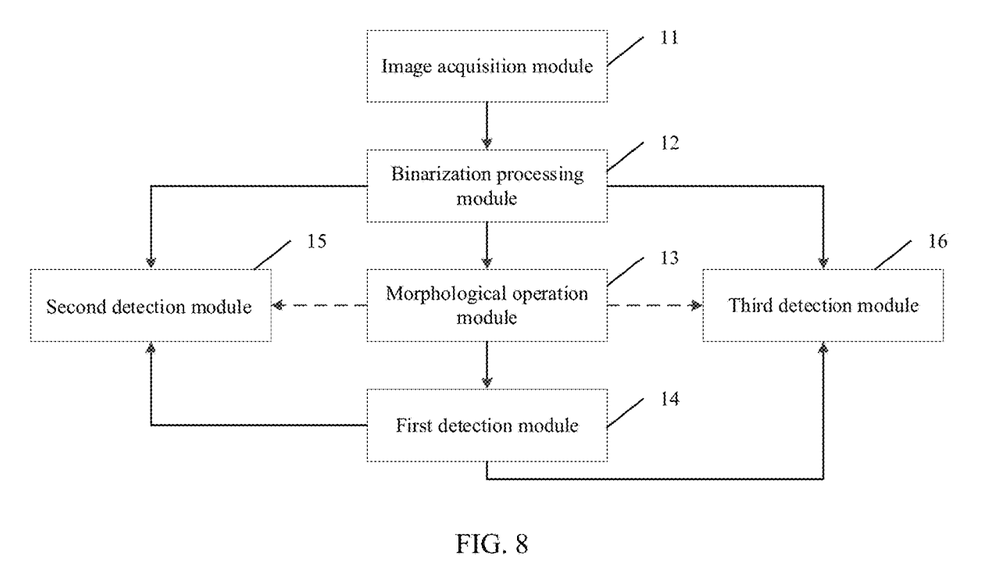
FIG. 8 is another exemplary diagram of the data processing device for a biochip provided by at least one embodiment of the present disclosure.

In some exemplary embodiments, referring to FIG. 8, the data processing device provided by this embodiment may further include a third detection module 16 configured to perform sample point detection on the target image based on the number of rows and the number of columns of the sample point array and the center position information of each sample point to determine the number of positive sample points; or obtain the number of positive sample points in the sample point array based on the target image by means a findContours function in an OpenCV.

For relevant description of the data processing device for a biochip provided by this embodiment, reference may be made to the description of the method embodiment, which is not described in detail herein.

The embodiment of the present disclosure further provides a data processing terminal including a memory and a processor. The memory stores a computer program, and the computer program, when executed by the processor, implements the steps of the data processing method for a biochip.

Figure 9:
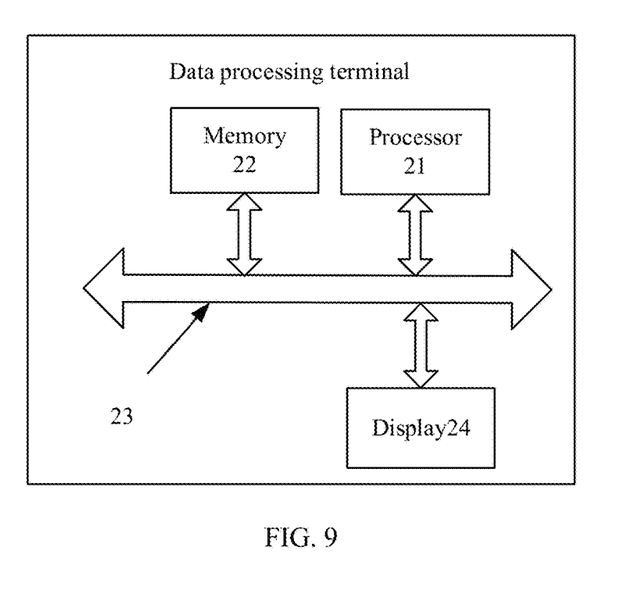
FIG. 9 is an exemplary diagram of a data processing terminal provided by at least one embodiment of the present disclosure.

FIG. 9 is an exemplary diagram of a data processing terminal provided by at least one embodiment of the present disclosure. Referring to FIG. 9, in an example, the data processing terminal includes a processor 21, a memory 22, a bus system 23, and a display 24. The processor 21, the memory 22, and the display 24 are connected to each other via the bus system 23. The memory 22 is configured to store instructions, and the processor 21 is configured to execute the instructions stored in the memory 22 to control display content of the display 24.

In some exemplary embodiments, the processor 21 may be a Central Processing Unit (CPU). The processor 21 may also be any one of other general-purpose processors, Digital Signal Processors (DSPs), Application Specific Integrated Circuits (ASICs), Field Programmable Gate Arrays (FPGAs) or other programmable logic devices, discrete gates or transistor logic devices, discrete hardware components, etc. A general-purpose processor may be a microprocessor or the processor may be any one of conventional processors, etc.

In some exemplary embodiments, the memory 22 may include a read-only memory and a random access memory, and provide instructions and data to the processor 21. A portion of the memory 22 may also include a non-volatile random access memory. For example, the memory 22 may also store information of device types.

In some exemplary embodiments, in addition to a data bus, the bus system 23 may include a power bus, a control bus, a status signal bus, and the like. However, for the purpose of clarity, at least one bus is marked as the bus system 23 in FIG. 9.

In some exemplary embodiments, the processing performed by the above data processing device may be accomplished by an integrated logic circuit of hardware or an instruction in the form of software in the processor 21. That is to say, the steps of the method disclosed in the embodiments of the present disclosure may be executed by the hardware processor or jointly executed by hardware and software modules in the processor. The software module may be located in a storage medium such as a random access memory, a flash memory, a read only memory, a programmable read-only memory or an electrically erasable programmable memory, or a register. The storage medium is located in the memory 22. The processor 21 reads information in the memory 22, and executes the steps in combination with its hardware. In order to avoid repetition, detailed description is not provided herein.

In addition, the embodiment of the present disclosure further provides a computer-readable medium storing a computer program. The computer program, when executed by a processor, implements the steps of the data processing method described above.

It can be understood by those skilled in the art that all or some of the steps in the method, systems, and functional modules/units in the device disclosed above may be implemented as software, firmware, hardware, and appropriate combinations thereof. In hardware implementation, the classification of the functional modules/units mentioned in the above description does not necessarily correspond to the classification of physical components. For example, a physical component may have multiple functions, or one function or step may be executed by several physical components in cooperation. Some or all of the components may be implemented as software executed by a processor such as a digital signal processor or a microprocessor, or implemented as hardware, or implemented as an integrated circuit such as an application specific integrated circuit. Such the software may be distributed on a computer-readable medium, which may include a computer storage medium (or non-transient medium), and a communication medium (or transient medium). As is well known to those skilled in the art, the term "computer storage medium" includes volatile and non-volatile, removable and non-removable media implemented in any method or technique for storing information (such as computer-readable instructions, data structures, program modules, or other data). The computer storage medium includes but is not limited to a RAM, a ROM, an EEPROM, a flash memory or other memory technology, a CD-ROM, a Digital Versatile Disc (DVD) or other optical disk storage, a magnetic cassette, a magnetic tape, magnetic disk storage or other magnetic storage devices, or any other media that can be used to store desired information and can be accessed by computers. In addition, it is well known to those skilled in the art that a communication medium typically contains computer-readable instructions, data structures, program modules or other data in modulated data signals such as carriers or other transmission mechanisms, and may include any information delivery medium.

The basic principle, main features, and advantages of the present disclosure are shown and described above. The present disclosure is not limited by the above embodiments. The above embodiments and description are only intended to describe the principle of the present disclosure. On the premise of not departing from the spirit and scope of the present disclosure, the present disclosure may have various changes and improvements, all of which fall into the scope of protection of the present disclosure.

What is claimed is:

1. A data processing method for a biochip, comprising:
   acquiring a biochip image to be detected;
   performing binarization processing on the biochip image to obtain a binary image;
   performing a morphological dilation operation on the binary image in a row direction to obtain a first image, and performing a morphological dilation operation on the binary image in a column direction to obtain a second image; and
   performing connected domain detection on the first image in the row direction, and performing connected domain detection on the second image in the column direction, to determine the number of rows and the number of columns of a sample point array and center position information of each sample point;
   further comprising:
   performing binarization processing on the biochip image to obtain a target image, or performing binarization processing and a morphological operation on the biochip image to obtain a target image, wherein a threshold used in the binarization processing performed to obtain the target image is greater than a threshold used in the binarization processing performed to obtain the binary image; and
   performing sample point detection on the target image based on the number of rows and the number of columns of the sample point array and the center position information of each sample point to determine the position of a positive sample point in the sample point array;
   wherein the performing sample point detection on the target image based on the number of rows and the number of columns of the sample point array and the center position information of each sample point to determine the position of a positive sample point in the sample point array comprises:
   obtaining an initialized sample point detection matrix based on the number of rows and the number of columns of the sample point array;
   traversing a pixel value corresponding to a center position of each sample point in the target image and a pixel value corresponding to a neighborhood of the center position of the sample point based on the center position information of each sample point in the sample point array; in response to detecting that a pixel value corresponding to a center position of any sample point in the target image or a pixel value corresponding to a neighborhood of the center position of the sample point is a first numerical value, updating an element value at a position corresponding to the sample point in the sample point detection matrix to a third numerical value; in response to detecting that a pixel value corresponding to a center position of any sample point in the target image or a pixel value corresponding to a neighborhood of the center position of the sample point is a second numerical value, maintaining the element value at the position corresponding to the sample point in the sample point detection matrix to an initial value; and determining the position of the positive sample point in the sample point array according to the position of the third numerical value in the sample point detection matrix obtained by traversing the target image.

2. The data processing method according to claim 1, wherein the performing a morphological dilation operation on the binary image in a row direction to obtain a first image comprises: performing the morphological dilation operation on the binary image in the row direction according to a first dilation operator to obtain the first image, wherein a connected domain in the row direction in the first image represents a row of sample points; and the performing a morphological dilation operation on the binary image in a column direction to obtain a second image comprises: performing the morphological dilation operation on the binary image in the column direction according to a second dilation operator to obtain the second image, wherein a connected domain in the column direction in the second image represents a column of sample points.

3. The data processing method according to claim 2, wherein the value of the first dilation operator in the row direction is the width of the biochip image, and the value of the second dilation operator in the column direction is the height of the biochip image.

4. The data processing method according to claim 1, wherein the performing connected domain detection on the first image in the row direction and performing connected domain detection on the second image in the column direction to determine the number of rows and the number of columns of a sample point array and center position information of each sample point comprises:

detecting a connected domain in the row direction in the first image to determine the number of rows of the sample point array and center position information of each row of sample points in the column direction;

detecting a connected domain in the column direction in the second image to determine the number of columns of the sample point array and center position information of each column of sample points in the row direction; and obtaining the center position information of each sample point according to the center position information of each row of sample points in the column direction and the center position information of each column of sample points in the row direction.

5. The data processing method according to claim 4, wherein the detecting a connected domain in the row direction in the first image to determine the number of rows of the sample point array and center position information of each row of sample points in the column direction comprises: based on the first image, obtaining the number of rows of the sample point array and the center position information of each row of sample points in the column direction by using a findContours function in an Open Source Computer Vision Library (OpenCV); and the detecting a connected domain in the column direction in the second image to determine the number of columns of the sample point array and center position information of each column of sample points in the row direction comprises: based on the second image, obtaining the number of columns of the sample point array and the center position information of each column of sample points in the row direction by using the findContours function in the OpenCV.

6. The data processing method according to claim 1, further comprising:

performing the sample point detection on the target image based on the number of rows and the number of columns of the sample point array and the center position information of each sample point to determine the number of positive sample points; or obtaining the number of positive sample points in the sample point array based on the target image by using a findContours function in an Open Source Computer Vision Library (OpenCV).

7. A non-transient computer-readable medium storing a computer program, wherein when the computer program is executed by a computer, the computer is caused to:

acquire a biochip image to be detected;

perform binarization processing on the biochip image to obtain a binary image;

perform a morphological dilation operation on the binary image in a row direction to obtain a first image, and perform a morphological dilation operation on the binary image in a column direction to obtain a second image; and perform connected domain detection on the first image in the row direction, and perform connected domain detection on the second image in the column direction, to determine the number of rows and the number of columns of a sample point array and center position information of each sample point;

wherein the computer is further caused to:

perform binarization processing on the biochip image to obtain a target image, or perform binarization processing and a morphological operation on the biochip image to obtain a target image, wherein a threshold used in the binarization processing performed to obtain the target image is greater than a threshold used in the binarization processing performed to obtain the binary image; and perform sample point detection on the target image based on the number of rows and the number of columns of the sample point array and the center position information of each sample point to determine the position of a positive sample point in the sample point array;

wherein the computer is further caused to:

obtain an initialized sample point detection matrix based on the number of rows and the number of columns of the sample point array;

traverse a pixel value corresponding to a center position of each sample point in the target image and a pixel value corresponding to a neighborhood of the center position of the sample point based on the center position information of each sample point in the sample point array; in response to detecting that a pixel value corresponding to a center position of any sample point in the target image or a pixel value corresponding to a neighborhood of the center position of the sample point is a first numerical value, update an element value at a position corresponding to the sample point in the sample point detection matrix to a third numerical value; in response to detecting that a pixel value corresponding to a center position of any sample point in the target image or a pixel value corresponding to a neighborhood of the center position of the sample point is a second numerical value, maintain the element value at the position corresponding to the sample point in the sample point detection matrix to an initial value; and determine the position of the positive sample point in the sample point array according to the position of the third numerical value in the sample point detection matrix obtained by traversing the target image.

8. A data processing device for a biochip, comprising: a processor configured to acquire a biochip image to be detected;

perform binarization processing on the biochip image to obtain a binary image;

perform a morphological dilation operation on the binary image in a row direction to obtain a first image and perform a morphological dilation operation on the binary image in a column direction to obtain a second image; and perform connected domain detection on the first image in the row direction and perform connected domain detection on the second image in the column direction, to determine the number of rows and the number of columns of a sample point array and center position information of each sample point;

wherein the processor is further configured to:

perform binarization processing on the biochip image to obtain a target image, or perform binarization processing and a morphological operation on the biochip image to obtain a target image, wherein a threshold used in the binarization processing performed to obtain the target image is greater than a threshold used in the binarization processing performed to obtain the binary image; and perform sample point detection on the target image based on the number of rows and the number of columns of the sample point array and the center position information of each sample point to determine the position of a positive sample point in the sample point array;

wherein the processor is further configured to:

obtain an initialized sample point detection matrix based on the number of rows and the number of columns of the sample point array;

traverse a pixel value corresponding to a center position of each sample point in the target image and a pixel value corresponding to a neighborhood of the center position of the sample point based on the center position information of each sample point in the sample point array; in response to detecting that a pixel value corresponding to a center position of any sample point in the target image or a pixel value corresponding to a neighborhood of the center position of the sample point is a first numerical value, update an element value at a position corresponding to the sample point in the sample point detection matrix to a third numerical value; in response to detecting that a pixel value corresponding to a center position of any sample point in the target image or a pixel value corresponding to a neighborhood of the center position of the sample point is a second numerical value, maintain the element value at the position corresponding to the sample point in the sample point detection matrix to an initial value; and determine the position of the positive sample point in the sample point array according to the position of the third numerical value in the sample point detection matrix obtained by traversing the target image.

9. The data processing device according to claim 8, wherein the processor is further configured to perform the sample point detection on the target image based on the number of rows and the number of columns of the sample point array and the center position information of each sample point to determine the number of positive sample points; or obtain the number of positive sample points in the sample point array based on the target image by using a findContours function in an Open Source Computer Vision Library (OpenCV).

* * * * *